Figure 1:
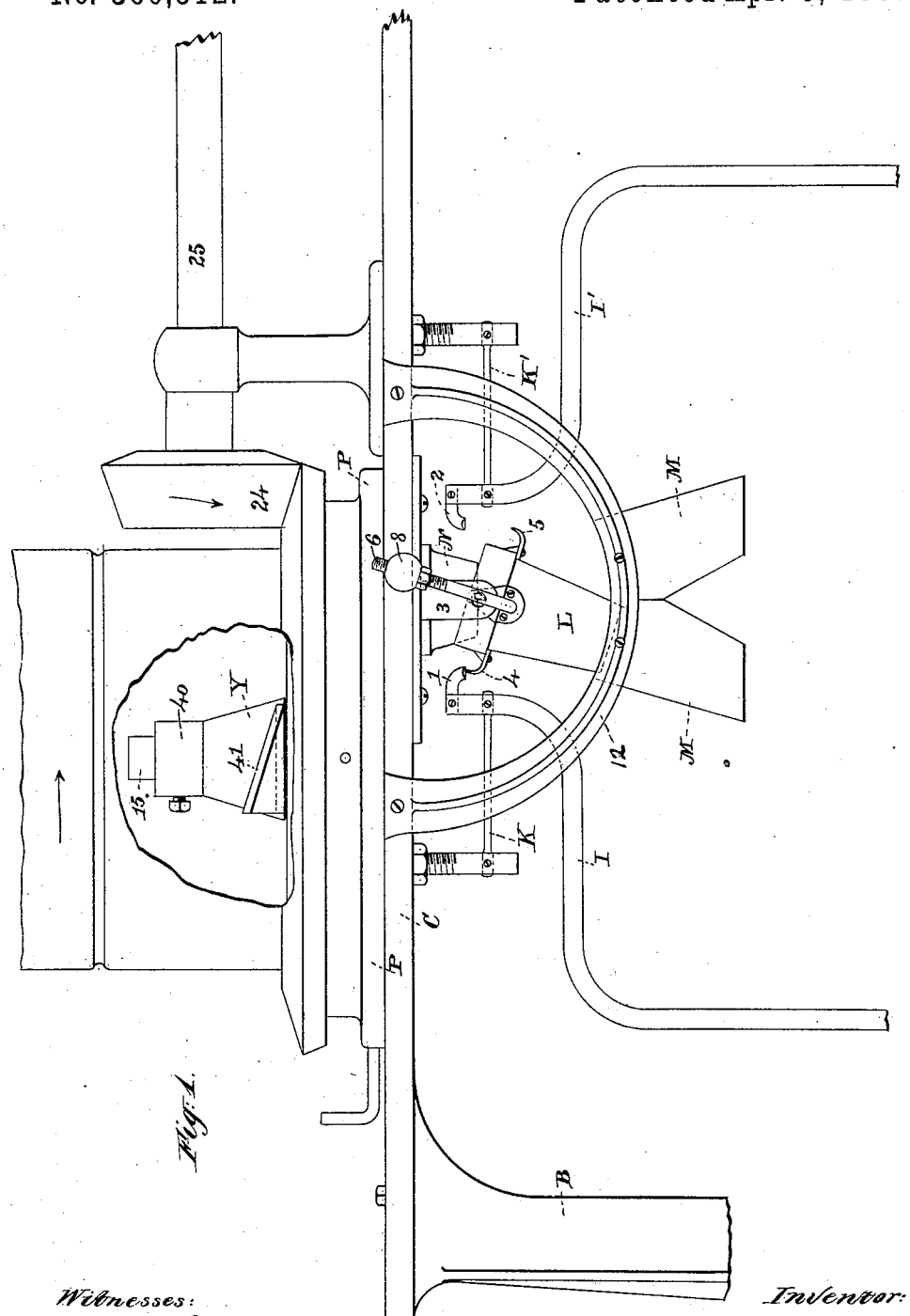

(No Model.)  2 Sheets—Sheet 1.

C. C. CLAWSON.
FEEDING MECHANISM FOR AUTOMATIC WEIGHING AND PACKAGE FILLING MACHINES.

No. 360,512.  Patented Apr. 5, 1887.

Witnesses:
Charles R. Searle,
Jas. K. McCathran

Inventor:
Clement Coleridge Clawson
by Chas. J. Hedrick
his attorney (No Model.) 2 Sheets—Sheet 2.

C. C. CLAWSON.
FEEDING MECHANISM FOR AUTOMATIC WEIGHING AND PACKAGE FILLING MACHINES.

No. 360,512. Patented Apr. 5, 1887.

UNITED STATES PATENT OFFICE.

CLEMENT COLERIDGE CLAWSON, OF NEWARK, NEW JERSEY, ASSIGNOR, BY DIRECT AND MESNE ASSIGNMENTS, TO THE UNITED STATES MACHINE AND INVENTIONS COMPANY, OF NEW YORK.

FEEDING MECHANISM FOR AUTOMATIC WEIGHING AND PACKAGE-FILLING MACHINES.

SPECIFICATION forming part of Letters Patent No. 360,512, dated April 5, 1887.

Application filed October 18, 1886. Serial No. 216,563. (No model.)

*To all whom it may concern:*

Be it known that I, CLEMENT COLERIDGE CLAWSON, a citizen of the United States, residing at Newark, in the county of Essex and State of New Jersey, have invented certain new and useful Improvements in Automatic Weighing and Package-Filling Machines, of which the following specification is a full, clear, and exact description.

This invention relates more particularly to machines for putting up powdered substances in packages of definite weight, although it may be otherwise applied.

It consists of a special feeding mechanism, and in the combination of such mechanism with an automatic weighing-machine of any ordinary or suitable description.

The following are the main features of the said feeding mechanism: (*a*) In connection with a suitable hopper or receptacle for the powdered material, there is a rotary feeder provided with an annular slot or groove formed therein, and so arranged that said slot or groove is supplied continuously from said hopper, and a stationary scraper or cutter is set in said slot or groove, so as to remove the material therefrom in a steady stream. The escape of the material from the slot or groove at other points is prevented by a stationary plate or guard, which is interrupted or perforated near the scraper or cutter to allow the delivery to take place. Preferably the hopper is attached to and rotates with the feeder, which forms a bottom to said hopper, the annular slot or groove being the outlet or mouth thereof. Preferably, also, the guard is formed by a stationary base-plate, on which the rotary hopper is mounted, the delivery-opening being formed therein, and the scraper or cutter projects upward through said opening. (*b*) A packer composed of one or more inclined arms, or of other suitable construction, is combined with the elements before named, it being arranged to force the material into the slot or groove. Preferably it is stationary, the material being carried against it by the rotation of the hopper and feeder. (*c*) The aforesaid scraper or cutter is made adjustable, so that its penetration into the slot or groove, and consequently the depth of the material removed thereby, can be regulated.

What is considered the best mode of applying the principle of the invention will now be described with the aid of the accompanying drawings, which form part of this specification, and which represent the feed mechanism constructed in accordance with the invention and combined with an automatic weighing-machine, so much only of the latter as considered useful in illustrating the application being represented.

Figure 2:
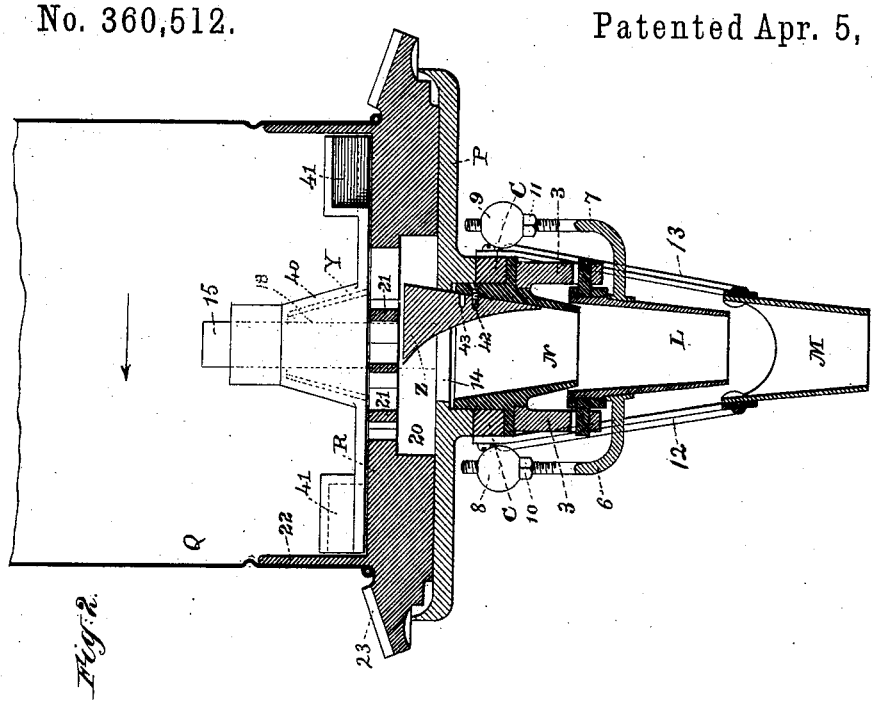
Figure 3:
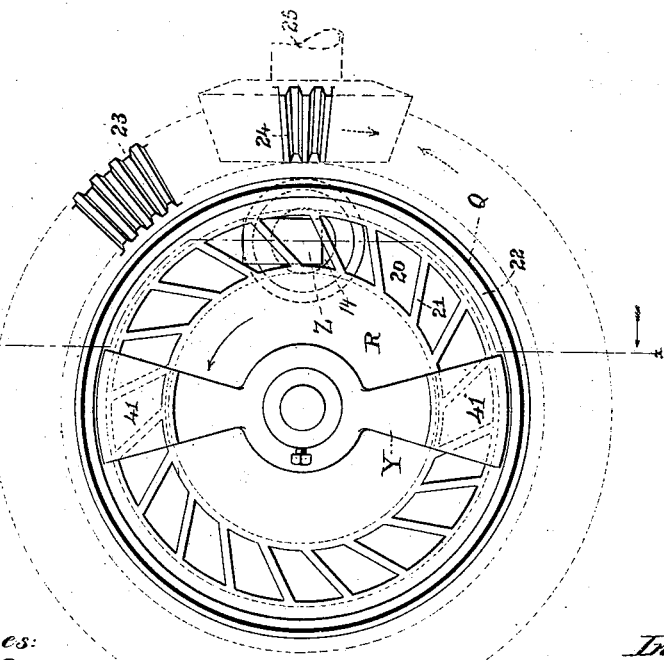

Figure 1 is a partial view in front elevation, a portion of the hopper being broken away; Fig. 2, a cross-section on line *x x* of Fig. 3, looking in the direction of the arrow; and Fig. 3, a partial view in plan.

The base-plate P of the feeding mechanism is supported on the cross-piece C of the weighing-machine frame. The ends of the cross-piece C are fastened to uprights B, the upper part of one of which only is represented.

At one side of the plate P is the delivery-opening 14, and just below it the spout N, which is fastened by a flange to the cross-piece and projects upward through the same, terminating just below the delivery-opening. In the center the upright post 15 is fixed. The rotary feeder and hopper-bottom R turns upon the post 15 as a center and rests upon the base-plate P.

Near the periphery of the part R is the annular slot or groove 20, and arms 21 at the top thereof connect the outer and inner portions. Openings between these arms allow the material to enter the slot or groove 20. The material is prevented from escaping by the plate P, constituting the guard. The hopper Q, in the form of a sheet-metal cylinder, is set over a vertical flange, 22, so that it is supported by and rotates with the feeder R. Rotation is imparted through the horizontal shaft 25, pinion 24, and bevel-gear 23, the latter formed in one piece with the feeder R.

Inside the hopper Q is the packer Y, having a hub, 40, which is fixed on the post 15, the lower conical part of the hub fitting over the boss 18 at the center of feeder R. The arms of the packer Y have the ends which overlie the annular groove or slot 20 inclined, as shown at 41, so as to pack the material into the same. The intermediate parts of the packing-arms are made flat, so as to lie close to the hopper-bottom and oppose as little resistance as may be to the rotation.

The cutter or scraper Z is fastened to the inside of the spout N near its upper part, and projects through the delivery-opening 14 into the annular slot or groove 20 in the hopper bottom or feeder R. The scraper or cutter Z is held in place by a screw, 42, which passes through the side wall of the spout, and is tapped into the shank of the scraper or cutter. This shank is provided with several threaded holes, 43, (two, as shown,) so that the scraper or cutter can be adjusted.

Other adjusting means could be used—as, for example, the screw could be tapped into a block, set in a dovetail or undercut groove in the scraper or cutter, so as to clamp the latter against the inner wall of the spout when the screw is tightened and to permit it to be adjusted when the screw is loosened. The hopper being rotated in the direction of the arrow, the inclined ends 41 of the packing-arms force the material between the arms 21 into the slot or groove 20, and when this material, being carried with the feeder, comes against the edge of the cutter or scraper Z more or less, depending on the elevation of the said edge above the bottom of the slot or groove 20, it is separated and falls through the spout N into the weighing-scale below.

As shown, there is below the stationary spout N an oscillating spout, L, which is to be turned from side to side, so as to control the delivery of the material to the weighing mechanism by diverting the stream of material alternately from one box or other packing vessel or receptacle into another, when the former has received its proper quantity, the movement being effected automatically by rods I I', fastened at their lower ends to the scale-pans of separate weighing-scales. (Not shown.) They are maintained in an upright position by links K K', respectively, which connect them with the cross-piece C, and carry fingers 1 and 2, respectively, for acting upon the lugs 4 and 5, respectively, on the oscillating spout L. This spout is suspended by knife-edges from the little hangers 3. It is provided with upright screw-rods 6 and 7, on which are adjustable nut-weights 8 and 9, of such size as to bring the center of gravity of the oscillating part above the axis of suspension. Jam-nuts 10 and 11 are shown for retaining the nut-weights 8 and 9. Below the spout L is the bifurcated spout M, supported by the semicircles 12 and 13.

In operation, the hopper Q being filled with the material—say powdered starch—and rotated, a constant uniform stream is delivered through the spouts N L M into the receptacle toward which the spout L is directed. When this receptacle has received its load, the scale-pan descends, drawing down the rod I or I' and turning the spout L in the direction to deliver the material into the other receptacle. The weights 8 and 9 complete the movement. For filling packages each scale has a flat plate on which the box or package to be filled is placed.

The parts of the machine not shown herein are or may be such as shown in my application of even date herewith, Case II officially numbered 216,562. The parts of the weighing mechanism shown, and also the hopper Q, feeder R, and base-plate P of the feeding mechanism, are the same as in that application, and in respect to all such matters it is to be observed that they are reserved to that application and are not included herein, the present application being in the nature of a supplement to my said application No. 216,562.

To apply the new or improved feeding mechanism to automatic weighing-machines which control the delivery of the material to the weighing mechanism by arresting instead of simply diverting the flow, a suitable chamber should be interposed between the delivery-opening 14 and the cut-off, as described in my application of even date, Case I officially numbered 216,561. The spout N could be utilized as such chamber, the cut-off working under it.

It is evident that modifications can be made in details without departing from the spirit of the invention, and that parts of the invention may be used separately.

The new feeding mechanism could be used wherever the delivery of a powdered substance in a stream is desired, its use not being restricted to automatic weighing-machines.

Having now explained the principle of the invention and the best mode to me known of applying said principle, I claim the following as my invention or discovery, namely:

1. The rotary feeder provided with an annular slot or groove formed therein, in combination with the hopper arranged to supply the material to said slot or groove, the stationary scraper or cutter in the said slot or groove to remove the material therefrom, and the stationary plate or guard arranged to retain the material in the slot or groove until it reaches the delivery-point, substantially as described.

2. The combination, with the hopper and a rotary feeder provided with an annular feeding slot or groove formed therein, of a packer to force the material in the hopper into said slot or groove, and a scraper or cutter placed at the point of delivery to remove the material from said slot or groove, substantially as described.

3. The feeding mechanism comprising, in combination, a hopper, rotary feeder and guard, and an adjustable scraper or cutter, said mechanism having an annular feeding slot or groove, in which said scraper or cutter is set, and the adjustment of said scraper or cutter enabling it to remove the material to a greater or less depth, as desired, substantially as described.

4. The combination, with the rotary feeding mechanism, comprising a hopper, feeder, and guard, and having an annular feeding slot or groove, of a stationary cutter or scraper projecting upward into said slot or groove, substantially as described.

5. The combination, with the rotary feeder in the form of a horizontal plate or disk provided with an annular feeding slot or groove, the hopper attached to and carried by the feeder, and the base-plate, forming as well a support to said feeder as a guard to retain the material in said slot or groove till it reaches the point of delivery, and provided with a delivery-opening, of a cutter or scraper projecting into said slot or groove through said delivery-opening, substantially as described.

6. The combination, with the rotary feeding mechanism having an annular feeding slot or groove, and comprising a hopper, a horizontal rotating feeder, and a guard, of a packer in said hopper to force the material into said slot or groove, and a scraper or cutter projecting upward into said slot or groove to remove the material, substantially as described.

7. The combination, with the horizontally-rotating disk-feeder provided with an annular slot or groove, the hopper carried by said feeder, the base-plate supporting said feeder and hopper and forming a guard to said slot or groove, and provided with a delivery-opening, of the stationary packer having inclined arms to act upon the material and force it into the annular slot or groove, and the scraper or cutter projecting through said delivery-opening into said slot or groove, substantially as described.

8. The combination, with the delivery-controlling means of an automatic weighing-machine, of a feeding mechanism comprising a hopper, a rotary feeder provided with an annular feeding slot or groove formed therein, a scraper or cutter set into said slot or groove, and a guard arranged to retain the material in the slot or groove until it reaches the point of delivery, substantially as described.

9. The combination, with the delivery-controlling means of an automatic weighing-machine, of a feeding mechanism comprising a hopper, a rotary feeder, a guard, a scraper or cutter, and a packer, the said mechanism having an annular feeding slot or groove in which said cutter or scraper is set, and the said packer being placed in the hopper and serving to force the material into said slot or groove, substantially as described.

10. The combination, with the delivery-controlling means of an automatic weighing-machine, of the rotary feeder in the form of a horizontal disk or plate provided with an annular slot or groove, the base-plate provided with the delivering-opening, the scraper or cutter projecting through said opening into said slot or groove, the hopper attached to and carried with said feeder, and the packer in said hopper for forcing the material into said groove, substantially as described.

In testimony whereof I have signed this specification in the presence of two witnesses.

CLEMENT COLERIDGE CLAWSON.

Witnesses:
ALEX. WILEY,
FRED R. STAATS.